US006281785B1

(12) United States Patent
Hamaguchi

(10) Patent No.: US 6,281,785 B1
(45) Date of Patent: Aug. 28, 2001

(54) VIBRATION GENERATOR FOR NOTIFICATION AND PORTABLE COMMUNICATION DEVICE USING THE VIBRATION GENERATOR

(75) Inventor: Toshihide Hamaguchi, Higashiosaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/381,375

(22) PCT Filed: Mar. 19, 1998

(86) PCT No.: PCT/JP98/01202

§ 371 Date: Sep. 20, 1999

§ 102(e) Date: Sep. 20, 1999

(87) PCT Pub. No.: WO98/42454

PCT Pub. Date: Oct. 1, 1998

(30) Foreign Application Priority Data

Mar. 21, 1997 (JP) .................................................. 9-068325
Mar. 31, 1997 (JP) .................................................. 9-080216

(51) Int. Cl.[7] ...................................................... H04B 3/36

(52) U.S. Cl. .................................... 340/407.1; 340/311.1; 340/825.46; 455/38.2; 379/52

(58) Field of Search ............................. 340/407.1, 311.1, 340/825.46, 825.44; 455/38.2, 567, 31.2, 31.1, 31.3, 550, 575; 379/374, 375, 383, 428, 52; 38/396, 412

(56) References Cited

U.S. PATENT DOCUMENTS 4,250,637 * 2/1981 Scott .................................... 434/114
5,172,092 * 12/1992 Nguyen ............................ 340/311.1
5,293,161 * 3/1994 MacDonald ..................... 340/825.46
5,528,697 * 6/1996 Saito ................................ 340/311.1
5,630,206 * 5/1997 Urban .................................. 340/993
5,722,071 * 2/1998 Berg .................................... 455/426
5,894,263 * 4/1999 Shimakawa ....................... 340/388.1
5,936,516 * 8/1999 Narea ............................... 340/407.1

* cited by examiner

*Primary Examiner*—Jeffery Hofsass
*Assistant Examiner*—Anh La
(74) *Attorney, Agent, or Firm*—Armstrong, Westerman, Hattori, McLeland & Naughton, LLP

(57) ABSTRACT

A device comprises a vibration generator having a magnetic circuit composed of a permanent magnet and a coil, and a diaphragm drivable by the magnetic circuit and secured to a fixed member so as to mechanically resonate at a frequency of f1, a signal generating circuit for producing a signal having the frequency of f1, a filter for blocking the frequency of f1, and selection means. The selection means operates to give notice to the user by applying the signal containing the frequency of f1 and generated by the signal generating circuit to the coil, or to deliver incoming speech to the user by applying a voice signal to the coil via the filter.

10 Claims, 6 Drawing Sheets

VIBRATION GENERATOR FOR NOTIFICATION AND PORTABLE COMMUNICATION DEVICE USING THE VIBRATION GENERATOR

TECHNICAL FIELD

The present invention relates to a notifying vibration generator for use in portable communications devices such as portable telephones and pagers, and also to portable communications devices wherein the generator is used.

BACKGROUND ART

Small-sized devices such as portable communications devices are equipped with means for notifying the user, for example, of incoming calls or specified hours. The notifying means most widely used is a bell or like means for producing a sound. However, in view of a nuisance to people in the surroundings, more widely used in recent years are small devices which have incorporated therein not only notifying means resorting to sound but also means for vibrating the device for notification so as to use both the notifying means or selectively use one of them in accordance with the situation. For example, FIG. 10 shows a portable telephone of the prior art. With reference to FIG. 10, the portable telephone has a telephone body 101, antenna 102, speaker 103 for incoming speech, microphone 104 for outgoing speech, display 105 and push buttons 106. The telephone body 101 has a ringer speaker 107 for giving notice of incoming calls with sound, and a vibration motor 108 for giving notice of incoming calls with vibration. With the prior art, it is general practice to incorporate means for notifying with sound and means for notifying with vibration into the device. The need to use the two separate notifying means therefore entails the problem that it is difficult to compact the device.

Accordingly, the present applicant invented a notifying vibration generator having the two functions of notifying with sound and notifying with vibration, and has already filed Japanese Patent Application No. 161399/1996 on this invention. FIGS. 11, (A) and (B) show this notifying vibration generator 109 of the prior application. The vibration generator 109 comprises two vibration systems, and a fixed member for supporting the vibration systems. According to this embodiment, the fixed member 110 comprises a lower case 110*a* for supporting the first of the vibration systems, and an upper case 110*b* supporting the second vibration system and joined to the lower case 110*a*. The lower case 110*a* and the upper case 110*b*, when joined, define an interior space for accommodating the two vibration systems. The upper case 110*b* is centrally formed with an opening 111 for propagating sound waves to the outside therethrough. The first vibration system comprises a first spring body 112 made of an elastic material such as a thin metal plate, rubber or resin and deformable perpendicular to the plane thereof, and a first vibrator 116 comprising a permanent magnet 113. The first vibrator 116 is attached to the first spring body 112 toward the inner periphery thereof as by bonding, and the first spring body 112 is attached at its outer periphery to the lower case 110*a* as by bonding, whereby the first vibration system is adapted to vibrate upward and downward relative to the lower case 110*a*. An upper yoke 114 and a lower yoke 115 are arranged respectively on and beneath the permanent magnet 113 providing the first vibrator 116 to prevent the magnetic field from leaking to the outside and to efficiently produce an electromagnetic force by the interaction of current and the magnetic field, whereby a magnetic circuit is formed. The magnet 113 is annular and has an N pole on its upper surface and an S pole on its lower surface. The upper yoke 114 is in the form of a ring having a vertical wall along the inner periphery thereof. The lower yoke 115 is in the form of a disk having a central protrusion. A magnetic gap 121 is formed inside the vertical wall of the upper yoke 114 around the central protrusion of the lower yoke 115 for permitting upward and downward movement of the second vibrator 117 to be described below.

On the other hand, the second vibration system comprises a second spring body 122 made of the same elastic material as the first spring body 112 and deformable perpendicular to the plane thereof, and a second vibrator 117 comprising a coil 118. The second vibrator 117 is positioned radially inwardly of the second spring body 122 and attached thereto as by bonding. The second spring body 122 has its outer periphery attached to the upper case 110*b* as by bonding, whereby the second vibrator 117 is adapted to vibrate upward and downward relative to the upper case 110*b*. The second vibrator 117 comprises the coil 118, a bobbin 119 supporting the coil 118, and a diaphragm 120 for producing sound waves. The bobbin 119 is hollow cylindrical and attached to the second spring body 122. The coil 118 is provided around the bobbin 119. The diaphragm 120 is disposed on the upper end of the bobbin 119. The coil 118 and the bobbin 119 are arranged in the magnetic gap 121 of the first vibrator 116 movably. Indicated at 123 are the terminals of the coil 118, and at 124 rubber or like cushions. The lower case 110*a* and the upper case 110*b* provided with the respective vibration systems are joined as described above, and the terminals 123 of the coil 118 are electrically connected to a circuit for passing electric current of predetermined frequency through the coil. Formed in the first vibrator 116 at this time is a magnetic circuit including the permanent magnet 113, upper yoke 114, lower yoke 115 and magnetic gap 121. The magnetic field in the gap 121 is directed radially inwardly thereof. Assuming that the current through the coil 118 is counterclockwise when the generator is seen from above, an interaction between the magnetic field and the current intersecting the field produces repulsion between the first vibrator 116 and the second vibrator 117. Conversely, if the direction of current through the coil 118 is reversed, attraction acts between the first vibrator 116 and the second vibrator 117. Accordingly, each of the first and second vibrators 116 and 117 is subjected to a periodic electromagnetic force as an external force by periodically varying the value of current to be passed through the coil 118. Thus, each of the first vibration system and the second vibration system can be caused to generate forced vibration by the combination of the permanent magnet 113 and the coil 118. By virtue the restoring force of the first spring body 112, the first vibration system transmits the forced vibration to the case 110, vibrating the device and realizing notification with the vibration. With the second vibration system, the forced vibration causes the diaphragm 120 of the second vibrator 117 to vibrate the air to produce sound waves, which propagate to the outside through the opening 111 in the upper case 110*b*. If the sound waves have an audio-frequency (about 20 Hz to about 20 kHz), notification with sound can be realized.

FIG. 12 is a graph showing the amplitude characteristics of the vibrators of the notifying vibration generator relative to the frequency of current passed through the coil 118 thereof. The first vibrator 116 and the second vibrator 117 have respective natural frequencies which are different, and are adapted to be maximum in amplitude respectively at f0 (e.g., 100 Hz) and f1 (e.g., 3 kHz).

The signal to be applied to such a notifying vibration generator of the prior art is in the form of rectangular waves rather than sine waves in view of the efficiency of the vibration relative to the power consumption and the advantage of the circuit construction for preparing the signal. However, if merely applied, rectangular waves encounter the problem that when the first vibrator 116 functions to generate mechanical vibration for notification, the high-frequency component of the rectangular waves applied also produces an unnecessary sound at the same time although no problem arises when the second vibrator 117 is vibrated to produce sound for notification. FIG. 13 is a graph showing the sound pressure level measurements obtained when rectangular waves of 110 Hz are applied to the notifying vibration generator for the generation of mechanical vibration. The graph reveals higher sound pressure levels in the range of about 1.2 kHz to 1.8 kHz, indicating that a disagreeable sound is produced along with mechanical vibration. The generation of such a disagreeable sound is the problem to be overcome since vibrating the device for notification is intended to avoid a nuisance to people in the surroundings as previously mentioned.

With the prior art described, notification with both vibration and sound can be realized by a single notifying device, which can therefore be compacted. When the notifying device of the prior art is further given the function of a speaker for incoming speech, there is the possibility of further compacting the device.

From the above viewpoint, an object of the present invention is to realize a notifying vibration generator which is singly adapted to give notice both with vibration and with sound and is yet capable of generating great vibration efficiently with reduced current consumption, and also to realize a portable communications device having incorporated therein a notifying vibration generator thus adapted and further having the function of a speaker for incoming speech.

DISCLOSURE OF THE INVENTION

The present invention provides a notifying vibration generator device characterized in that the device comprises a vibration generator having a magnetic circuit composed of a permanent magnet and a coil, a first vibrator drivable by the magnetic circuit and mechanically resonating at a frequency of f0 and a second vibrator mechanically resonating at a frequency of f1, a rectangular wave generating circuit for generating a rectangular wave signal having a frequency of f0, a filter having a cut-off frequency between f0 and f1 for receiving the signal output from the rectangular wave generating circuit and outputting a first signal, a second signal generating circuit for generating a signal containing a signal with the frequency of f1, and switch means for selectively applying one of the first signal and the second signal to the vibration generator.

Thus, a signal of frequency f0 obtained upon passage through the filter and serving as the first signal, or a signal of frequency f1 as the second signal is applied, as selected by the switch means, to the vibration generator to give notice with vibration or sound.

The present invention provides as another feature thereof a notifying vibration generator device characterized in that the device comprises a vibration generator having a magnetic circuit composed of a permanent magnet and a coil, and a diaphgram drivable by the magnetic circuit and secured to a fixed member so as to mechanically resonate at a frequency of f1, a signal generating circuit for producing a signal having the frequency of f1, a filter for blocking the frequency of f1, and switch means for determining whether the signal containing the frequency of f1 and generated by the signal generating circuit is to be applied to the coil or a voice signal is to be applied to the coil via the filter.

Thus, the signal of frequency f1 or the voice signal having the frequency of f1 blocked by the filter is applied as selected by the switch means to the vibration generator for notification with a sound or reproduction of the voice signal.

BEST MODE OF CARRYING OUT THE INVENTION

Embodiments of the present invention will be described below in detail with reference to the drawings.

Figure 1:
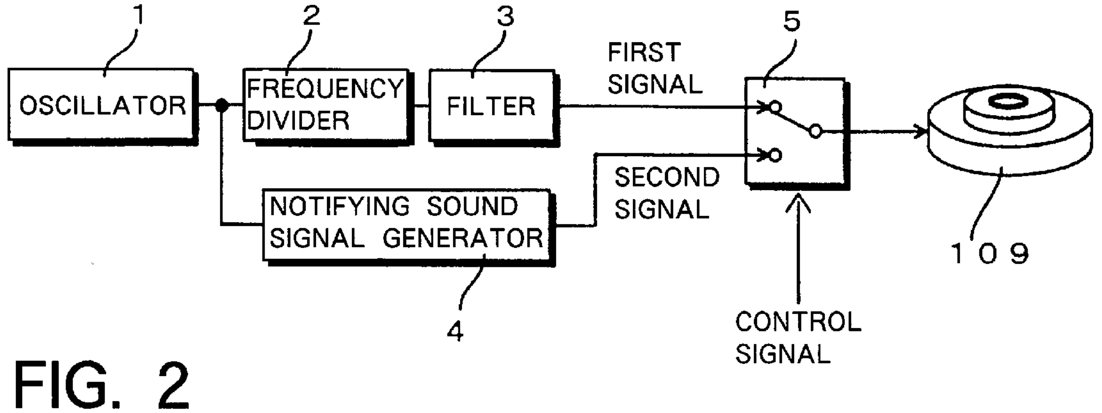
FIG. 1 is a block diagram showing a first embodiment of notifying vibration generator of the invention.
Figure 2:
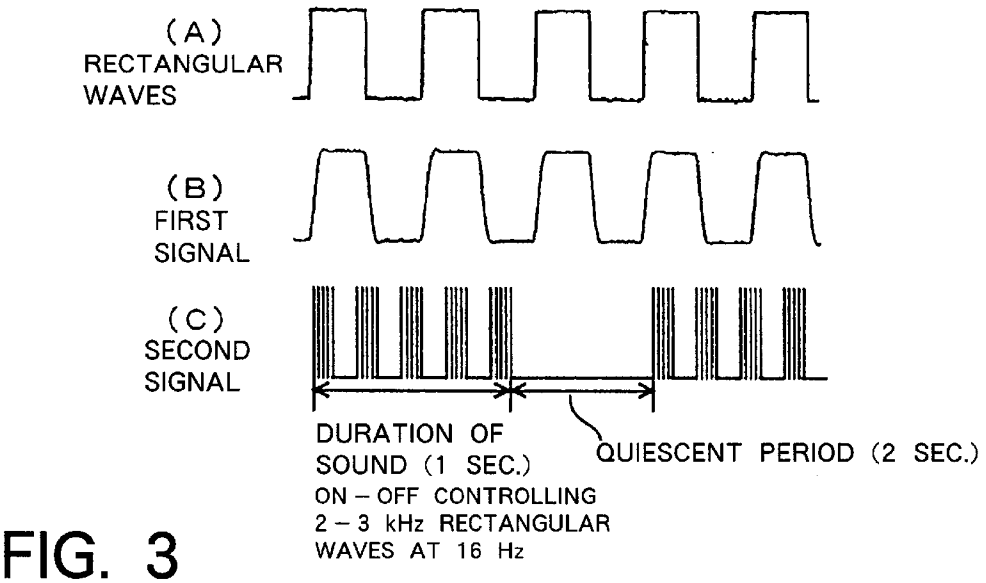
FIG. 2 includes waveform diagrams showing first and second signals to be applied to the notifying vibration generator of the first embodiment.
Figure 11A:
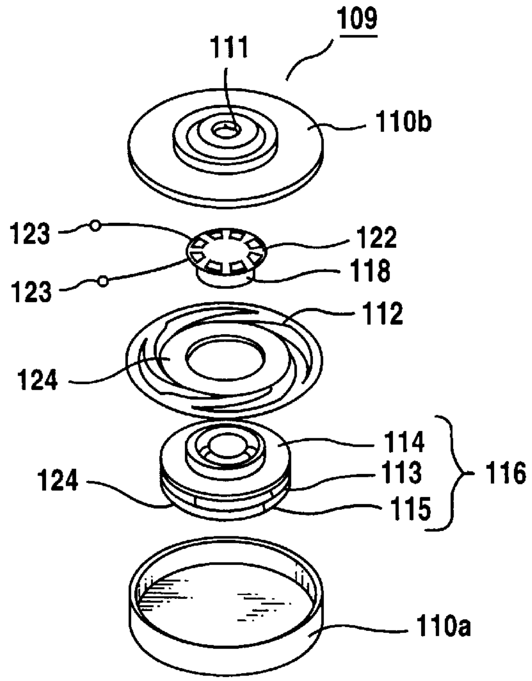
FIGS. 11A and 11B includes views showing a conventional vibration generator.
Figure 11B:
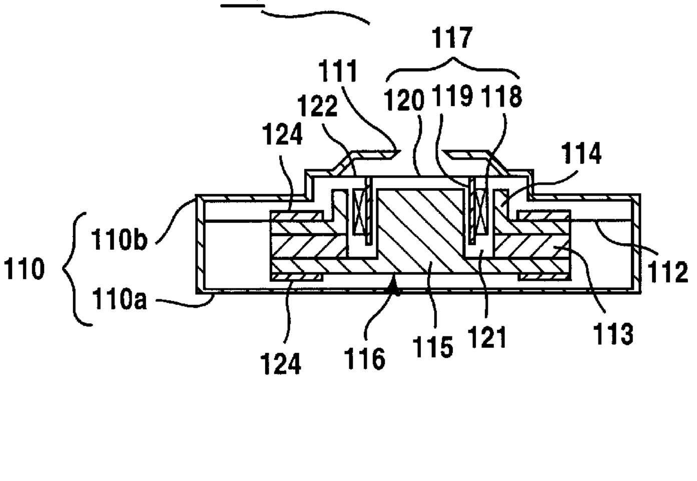
Figure 12:
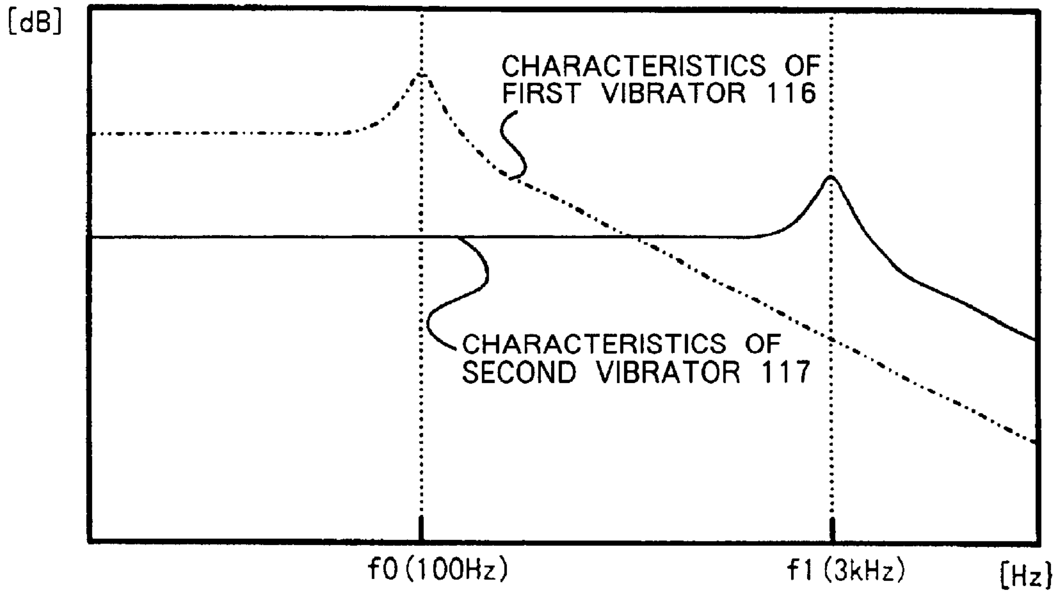
FIG. 12 is a diagram showing the amplitude characteristics of the conventional notifying vibration generator.

With reference to FIG. 1 showing a notifying vibration generator, indicated at 1 is an oscillator for generating rectangular waves, and at 2 a frequency divider for frequency-dividing the rectangular wave output of the oscillator. The vibration generator 109 has the same construction as the conventional vibration generator shown in FIGS. 11(A) and (B). The oscillator 1 and the frequency divider 2 provide a circuit for generating rectangular waves, and produce rectangular waves having a frequency generally in match with the resonance frequency f0 of a first vibrator 116 of a vibration generator 109. Indicated at 3 is a filter circuit comprising a low-pass filter having a cut-off frequency higher than the resonance frequency f0 of the first vibrator 116 and lower than the resonance frequency f1 of a second vibrator 117. The filter circuit 3 outputs as a first signal the rectangular-wave signal delivered from the frequency divider 2 upon blocking the high-frequency component of the signal. Indicated at 4 is a notifying sound signal generating circuit which provides a second signal generating circuit along with the oscillator 1. The rectangular waves produced by the oscillator 1 are on-off controlled by the circuit 4 at predetermined timing as will be described below for the circuit 4 to produce and output a second signal for giving notice with sound, the second signal containing a signal having a frequency which is the resonance frequency f1 of the second vibrator 117. FIG. 2 includes diagrams showing the waveforms of the first signal and the second signal; (A) showing the signal output from the frequency divider 2, (B) the first signal output from the filter 3, and (C) the second signal output from the notifying sound signal generating circuit 4. The circuit 4 on-off controls at 16 Hz the rectangular waves, for example, of 3 kHz delivered from the oscillator 1 and further produces a one-second on period and a two-second off period subsequent thereto to prepare the second signal. Accordingly, the second signal contains the resonance frequency f1 (3 kHz) of the second vibrator 116, and comprises one-second duration of sound generation and two-second quiescent period like the usual ringer sound of the telephone.

Switch means 5 is controlled by a control signal from an unillustrated control circuit for selectively applying the first signal or second signal to the vibration generator 109. For example, suppose the notifying vibration generator of the invention is used in a portable telephone. In this case, the user sets the telephone in advance for giving notice of incoming calls with sound or with vibration as selected, and the switch means 5 is changed over by the control signal according to the setting. When an incoming call is received, the rectangular wave generating circuit 1, 2 produces rectangular waves. If the telephone is set by the user for notification with sound, the second signal output from the notifying sound generating circuit 4 is applied to the generator 109, producing a ringer sound by the vibration of the second vibrator 117 to give notice of the call. In the case where the telephone is set by the user for notification with vibration, the first signal from the filter 3 is applied to the generator 109, giving notice with the mechanical vibration of the first vibrator 116.

Figure 3:
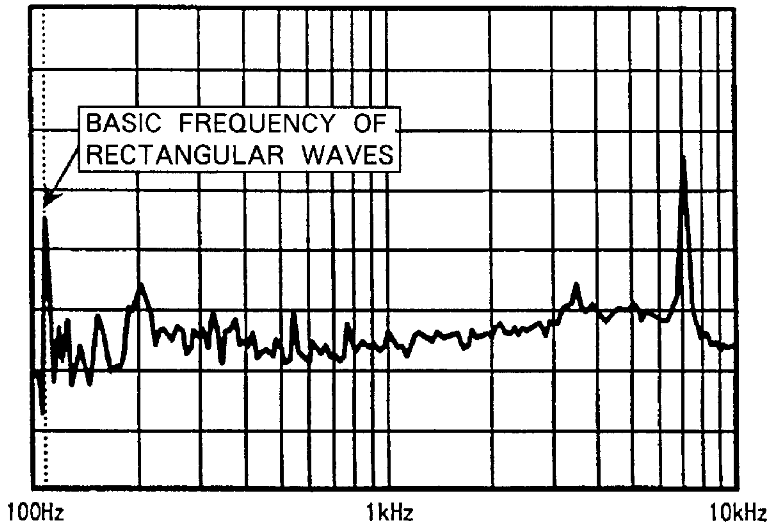
FIG. 3 is a waveform diagram showing the sound pressure level of the notifying vibration generator of the first embodiment.
Figure 13:
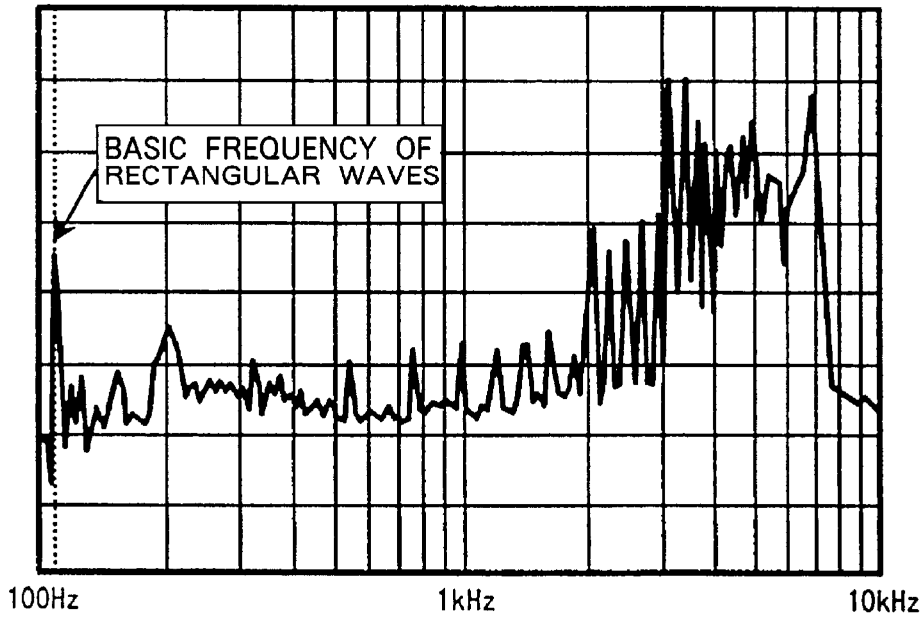
FIG. 13 is a diagram showing the sound pressure level of the conventional notifying vibration generator.

FIG. 3 is a graph showing the sound level resulting from the application of the first signal by the filter 3 to the vibration generator 109. As compared with the foregoing case wherein rectangular waves are merely applied as seen in FIG. 13, the sound levels in the range of about 2 kHz to about 8 kHz are lower to prevent generation of an unnecessary sound.

Figure 4:
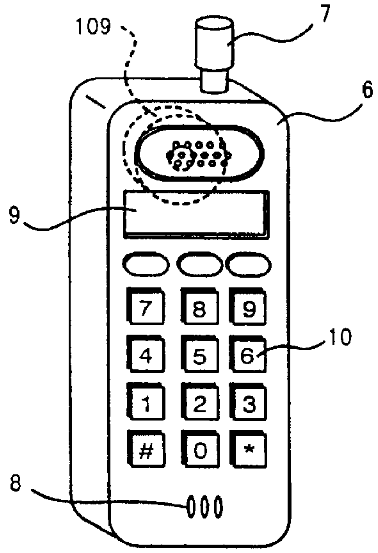
FIG. 4 is a diagram showing a second embodiment of notifying vibration generator of the invention.

Next, FIG. 4 shows a second embodiment of the invention as applied to a portable telephone. The drawing shows the body 6 of the portable telephone, antenna 7, microphone 8 for outgoing speech, display 9 and push buttons 10. The telephone body 6 has incorporated therein a vibration generator 109, such as the one described above, at a position to be opposed to the ear when the microphone 8 is positioned for the mouth of the user.

Figure 5:
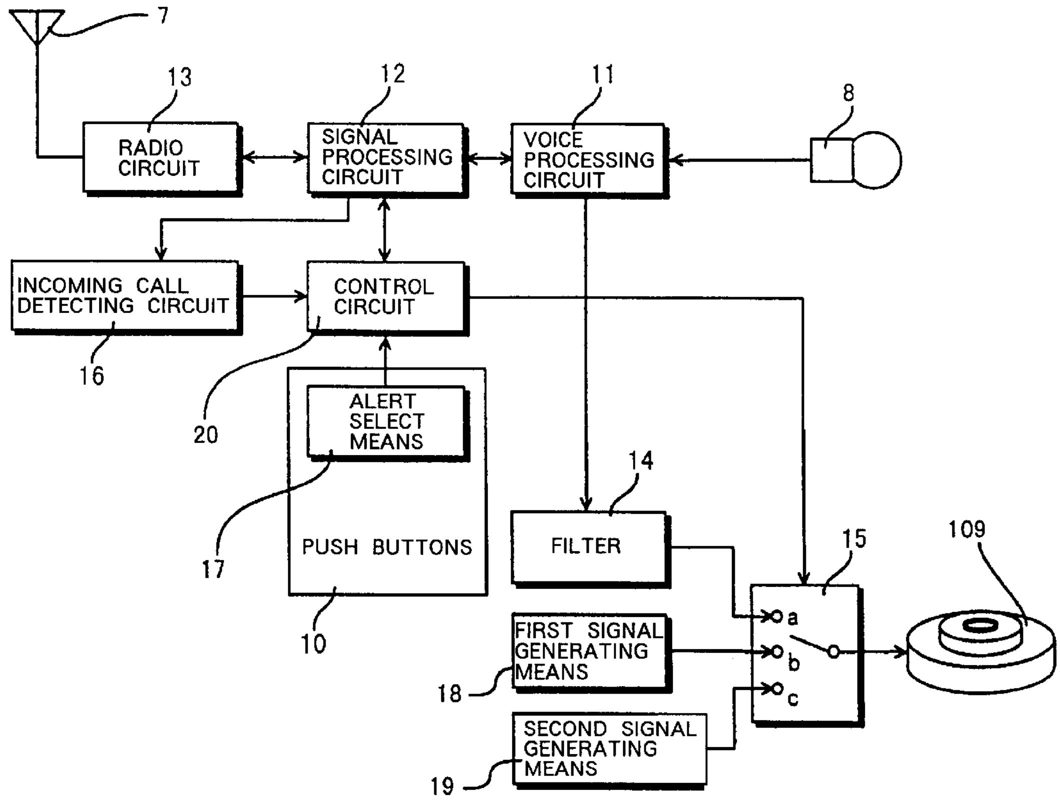
FIG. 5 is a block diagram showing the second embodiment of notifying vibration generator of the invention.

FIG. 5 is a block diagram of the this embodiment. An analog voice signal input through the microphone 8 is converted by a voice processing circuit 11 into a digital voice signal, which is then processed by a signal processing circuit 12, fed to a radio circuit 13 for frequency conversion and modulation and transmitted from the antenna 7 as a specified output. On the other hand, a signal received by the antenna 7 is frequency-converted and demodulated in the radio circuit 13 and fed to the signal processing circuit 12, which delivers a digital voice signal. The signal is fed to the voice signal processing circuit 11 for conversion to an analog voice signal, which is sent to a filter circuit 14 and thereafter applied to a terminal a of switch means 15 having three terminals a, b, c. The filter circuit 14 comprises a low-pass filter or notch filter and is adapted to cut off frequencies around the resonance frequency f1 (3 kHz) of the second vibrator 117 as will be described in detail later.

Indicated at 16 is a circuit for detecting incoming calls. The portable telephone always intermittently receives radio waves transmitted from the public base station, and detects an incoming call, if any, by the incoming call detecting circuit 16 from the control signal processed by the signal processing circuit 12. Indicated at 17 is alert select means for selecting sound or vibration for use in notifying the user of the incoming call. This means 17 is provided by one of the push buttons 10, or by some of the buttons 10 to be pressed in combination. The manipulation of the alert select means 17 is transmitted to a control circuit 20, which changes over the switch means 15 upon the circuit 16 detecting the incoming call. Indicated at 18 and 19 are first and second signal generating means connected to the respective terminals b, c of the switch means 15 for producing the signals to be applied to the notifying vibration generator 109. The control circuit 20 controls the overall generator.

Figure 6:
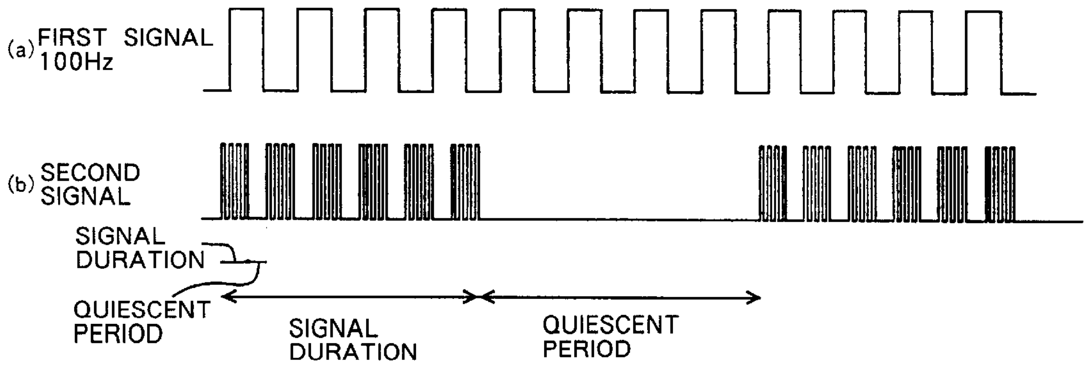
FIG. 6 includes waveform diagrams showing first and second signals to be applied to the notifying vibration generator of the second embodiment.

FIG. 6 includes diagrams showing examples of first signal and second signal. The first signal is in the form of 100-Hz rectangular waves as shown in FIG. 6, (a), and has a frequency equal to the natural frequency of the first vibrator 116 of the vibration generator 109. The first vibrator 116 can be vibrated by feeding the first signal to the generator 109. As shown in FIG. 6, (b), the second signal comprises a signal duration for which a 3-kHz signal is produced and a quiescent period in which no signal is generated. When applied to the vibration generator 109, the second signal vibrates the second vibrator 117 of the generator 109 to produce a sound. A desired ringer sound can be produced at this time by setting the signal duration and the quiescent period at suitable values.

Figure 7:
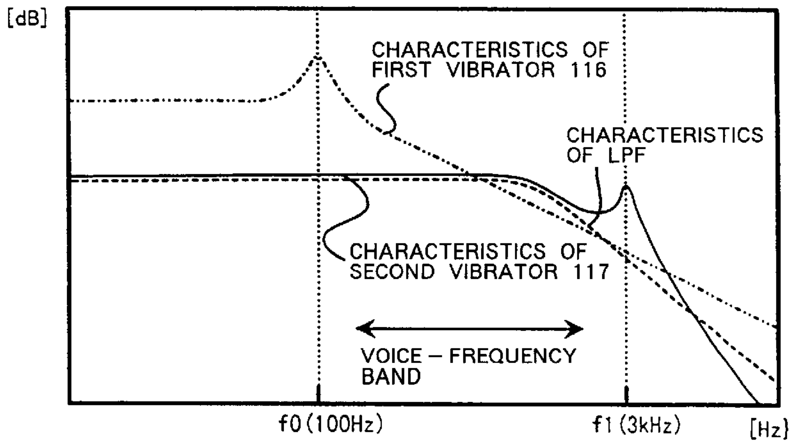
FIG. 7 is a diagram showing the amplitude characteristics of notifying vibration generator of the second embodiment.

As specified by the user with the alert select means 17, the first or second signal generating means 18 or 19 is connected to the vibration generator 109 under the control of the control circuit 20 on receiving an incoming call, notifying the user of the call with vibration or sound. FIG. 7 is a graph showing the amplitude characteristics of the vibrators of the vibration generator 109 relative to the frequency of the current to be passed through the coil 118 thereof, and the filter characteristics of the filter circuit 14 when this circuit comprises a low-pass filter. As illustrated, the low-pass filter constituting the filter circuit 14 has characteristics to attenuate the frequencies not lower than the resonance frequency f1 of the second vibrator 117. Accordingly, the signal applied to the vibration generator by way of the filter circuit 14 gives the second vibrator 117 the characteristics represented by a solid line. While the frequency band of voice signals usually used in telephone communication is 300 Hz to 3 kHz, the provision of the filter circuit 14 eliminates the influence of the resonance frequency of the second vibrator 117.

Figure 8:
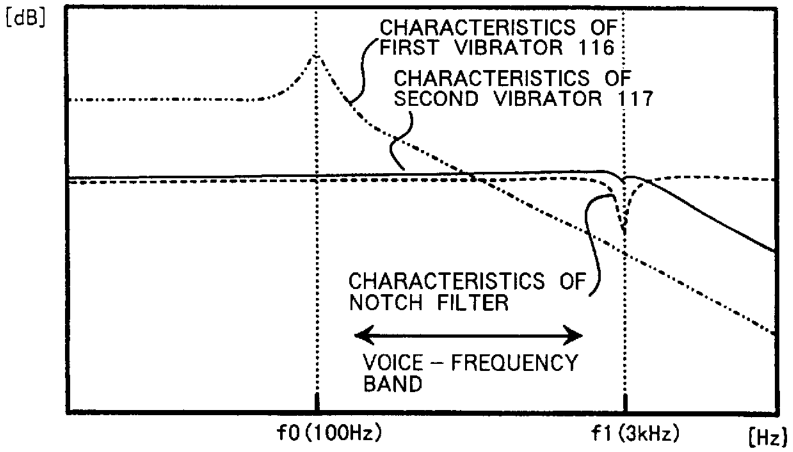
FIG. 8 is a diagram showing the amplitude characteristics of notifying vibration generator of the second embodiment.

FIG. 8 is a graph showing the amplitude characteristics of the vibrators of the vibration generator 109 relative to the frequency of the current to be passed through the coil 118 thereof, and the filter characteristics of the filter circuit 14 when this circuit comprises a notch filter. As illustrated, the notch filter constituting the filter circuit 14 has characteristics to attenuate frequencies around the resonance frequency f1 of the second vibrator 117. Accordingly, the signal applied to the vibration generator 109 by way of the filter circuit 14 comprising the notch filter gives the second vibrator 117 the characteristics represented by a solid line. Thus, the provision of the filter circuit 14 similarly eliminates the influence of the resonance frequency of the second vibrator 117.

Figure 9:
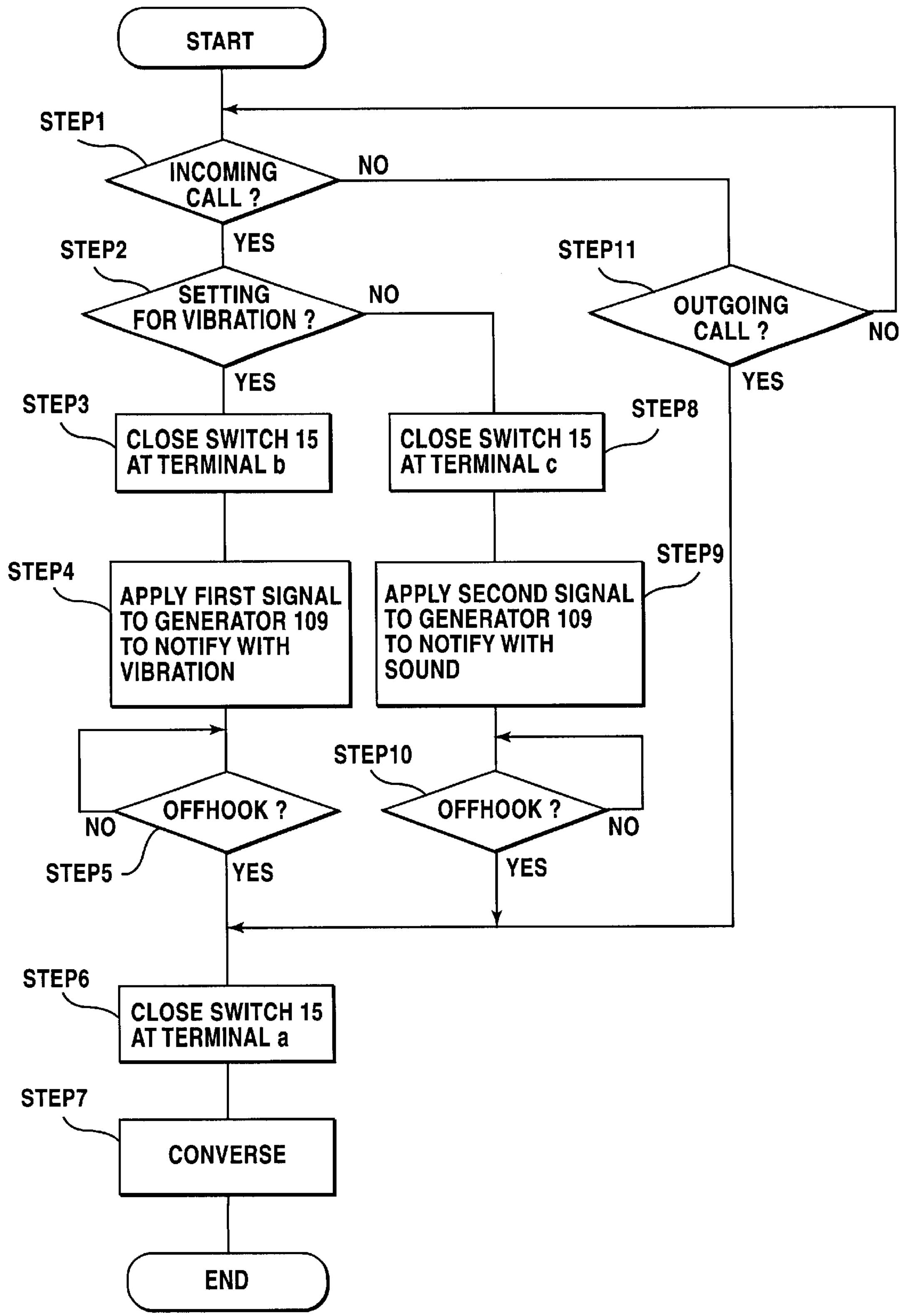
FIG. 9 is a flow chart showing the operation of a portable communications device incorporating the notifying vibration generator of the second embodiment.
Figure 10:
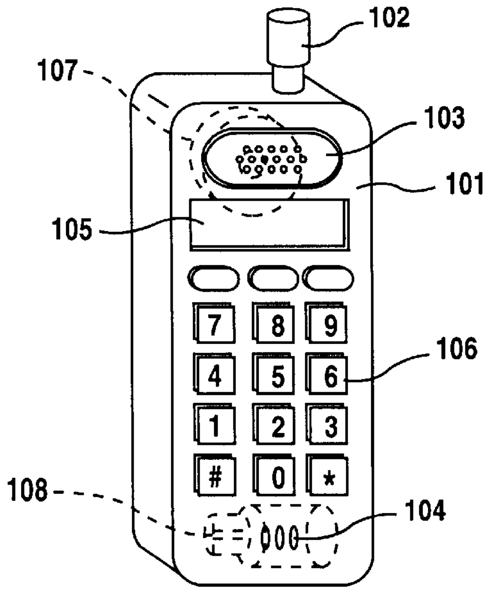
FIG.10 PRIOR ART
FIG. 10 is a diagram showing a portable communications device of the prior art.

Next with reference to the flow chart of FIG. 9, a description will be given of the operation of the portable communications device incorporating the notifying vibration generator of the invention. As already described, the portable telephone 6 always intermittently receives radio waves transmitted from the public base station, and detects an incoming call, if any, by the incoming call detecting circuit 16 from the control signal processed by the signal processing circuit 12. Upon the detection of the incoming call in step 1, the setting of the alert select means 17 indicating the selection made by the user is detected in step 2. When the setting is found to be "vibration alert mode," the switch means 15 is changed over for connection at the terminal b under the control of the control circuit 20 in step 3. As a result, the first signal produced by the first signal generating means 18 is applied to the vibration generator 109 in step 4, notifying the user of the incoming call. When the user, becoming aware of the notification, sets the telephone in the off hook condition for communication, step 5 detects this condition, whereupon the switch means 15 is changed over in step 6 for connection at the terminal a under the control of the control circuit 20. Consequently, the telephone is set in condition for communication in step 7. The voice of the incoming call delivered from the voice processing circuit 11 at this time is applied to the vibration generator 109 via the filter 14, so that the signal of frequencies around the resonance frequency f1 of the second vibrator 117 is cut off, producing no influence on the incoming speech.

If the setting of the alert select means 17 selected by the user is not "vibration alert mode" but is found to be "sound alert mode" in step 2, the switch means 15 is changed over in step 8 for connection at the terminal c under the control of the control circuit 20. As a result, the second signal produced by the second signal generating means 19 is applied to the vibration generator 109 in step 9, notifying the user of the incoming call. When the user thus alerted sets the telephone in the off hook condition for communication, step 10 detects this condition, followed by step 6 and step 7 for the start of communication as stated above. On the other hand, when a manipulation for an outgoing call made by the user is detected in step 11, the switch means 15 is changed over for connection at the terminal a in step 6, and the telephone is set in condition for communication in step 7.

INDUSTRIAL APPLICABILITY

When the notifying vibration generator of the invention described above gives notice with vibration, rectangular waves output from a rectangular wave generating circuit are applied to the generator via a filter, whereby a great vibration is available without producing unnecessary sound to ensure reliable notification. The use of rectangular waves results in a simpler circuit construction and smaller power consumption than when sine waves are used.

Voice signals are applied through a filter to the means for giving notice of incoming calls, so that a ringer sound can be efficiently produced by applying a signal of resonance frequency to this means when giving notice. When incoming speech is received, the filter attenuates the signal of resonance frequency to deliver the speech appropriately. Because the device of the invention is adapted not only to give notice of incoming calls but also to transmit voice signals and is further capable of giving notice with vibration as selected, the device can be compacted in its entirety while assuring reliable notification of incoming calls.

What is claimed is:

1. A notifying vibration generator device comprising:

a vibration generator having a magnetic circuit composed of a permanent magnet and a coil;

a first vibrator drivable by the magnetic circuit and mechanically resonating at a frequency of f0;

a second vibrator mechanically resonating at a frequency of f1;

a rectangular wave generating circuit for generating a rectangular wave signal having frequency of f0;

a filter having a cut-off frequency between f0 and f1 for receiving the signal output from the rectangular wave generating circuit and outputting a first signal;

a second signal generating circuit for generating a second signal containing a signal with the frequency of f1; and switch means for selectively applying, one of the first signal and the second signal to the vibration genaerator, wherein the first signal and the second signal are different rectangular wave signals and the rectangular wave signal for the second signal has a quiescent period and an active period which are set at values for a desired ringer sound.

2. A notifying vibration generator device according to claim 1, characterized in that the rectangular wave generating circuit comprises an oscillator and a frequency divider for frequency-dividing the rectangular waves output from the oscillator.

3. A notifying vibration generator device according to claim 1 characterized in that the second signal generating circuit comprises as oscillator and a notifying sound signal generating circuit for on-off controlling at a predetermined time interval the rectangular waves output from the oscillar to produce a notifying sound signal.

4. A notifying vibration generator device according to claim 1 characterized in that the first signal and the second signal are produced by a single oscillator.

5. A notifying vibration generator device comprising:

a vibration generator having a magnetic circuit composed of a permanent magnet and a coil;

a diaphragm drivable by the magnetic circuit and secured to fixed member so as to mechanically resonate at a frequency of f1;

a signal generating circuit for producing a signal containing a signal component with the frequency of f1;

a filter for depressing the signal component of the frequency of f1; and selection means for determining whether the signal generated by the signal generating circuit is to be applied to the coil or a voice signal is to be applied to the coil via the filter, wherein the signal has a quiescent period and an active period which are set at values for desired ringer sound.

6. A notifying vibration generator device according to claim 5 characterized in that the filter is a low-pass filter.

7. A notifying vibration generator device according to claim 5 characterized in that the filter is a notch filter.

8. A notifying vibration generator device according to claim 5 characterized in that the permanent magnet is secured by a support member to the fixed member so as to mechanically resonate at a frequency of f0, the device further having a signal generating circuit for producing a signal having the frequency of f0, the signal generating means being selectively applied by the selection means.

9. A portage communications device comprising:

a vibration generator having a magnetic circuit composed of a permanent magnet and a coil;

a diaphragm drivable by the magnetic circuit and secured to a fixed member so as to mechanically resonate at a frequency of f1;

a support member supporting the permanent magnet on the fixed member so as to mechanically vibrate the magnet at a frequency of f0;

a first signal generating circuit for generating a first signal having the frequency of f0;

a second signal generating circuit for generating a second signal containing a signal component with the frequency of f1;

a filter for depressing the signal component of the frequency of f1;

selection means for determining whether (1) the second signal generated by the second signal generating circuit is to be applied to the coil, (2) a voice signal is to be applied to the coil via the filter, or (3) the first signal generated by the first signal generating circuit is to be applied to the coil;

a circuit for detecting incoming calls; and control means for controlling the selection means so as to select one of the first signal generating circuit and the second signal generating circuit according to a setting predetermined by the user upon the detecting means detecting the incoming call for the application of the first or second signal generated by the selected circuit to the coil and to apply a voice signal of the incoming call to the coil via the filter in conformity with a response of the user to the incoming call, wherein the first signal and the second signal are different rectangular wave signals and the rectangular wave signal for the second signal has a quiescent period and an active period which are set at values for desired ringer sound.

10. A portable communications device according to claim 9 characterized in that a microphone for outgoing speech is disposed at lengthwise one end of a body of the device, the vibration generator being disposed at the other end of the device body.

* * * * *

UNITED STATES PATENT AND TRADEMARK OFFICE

CERTIFICATE OF CORRECTION

PATENT NO. : 6,281,785 B1
DATED : August 28, 2001
INVENTOR(S) : Toshihide Hamaguchi It is certified that error appears in the above-identified patent and that said Letters Patent is hereby corrected as shown below:

Column 8,
Line 19, delete the comma;
Line 33, change "as" to read -- an --;
Line 35, change "oscillar" to read -- oscillator --;
Line 66, between "f0," and "the", insert -- the signal from --; and Column 9,
Line 1, change "portage" to read -- portable --.

Signed and Sealed this

Thirteenth Day of August, 2002

*Attest:*

JAMES E. ROGAN

*Attesting Officer*

*Director of the United States Patent and Trademark Office*